United States Patent
Gibson et al.

(10) Patent No.: US 7,213,682 B2
(45) Date of Patent: May 8, 2007

(54) HYDRAULIC FLUID STORAGE APPARATUS FOR A TRANSMISSION

(75) Inventors: Patrick M. Gibson, Ypsilanti, MI (US); James A. Springer, Ann Arbor, MI (US); David J. Varda, Ypsilanti, MI (US)

(73) Assignee: General Motors Corporation, Detroit, MI (US)

( * ) Notice: Subject to any disclaimer, the term of this patent is extended or adjusted under 35 U.S.C. 154(b) by 608 days.

(21) Appl. No.: 10/717,417

(22) Filed: Nov. 19, 2003

(65) Prior Publication Data

US 2005/0103570 A1     May 19, 2005

(51) Int. Cl.
F16H 57/04     (2006.01)
(52) U.S. Cl. .................................... 184/6.12
(58) Field of Classification Search ............... 184/6.12, 184/7.3, 70; 74/606 R
See application file for complete search history.

(56) References Cited

U.S. PATENT DOCUMENTS

| | | | | |
|---|---|---|---|---|
| 1,220,810 A | * | 3/1917 | Alquist | 184/6.12 |
| 3,529,698 A | * | 9/1970 | Nelson | 184/6.12 |
| 3,625,310 A | * | 12/1971 | Herrick | 184/6.12 |
| 4,630,711 A | * | 12/1986 | Levrai et al. | 184/6.12 |
| 4,721,184 A | * | 1/1988 | Sowards | 184/6.12 |
| 4,736,819 A | * | 4/1988 | Muller | 184/6.12 |
| 5,768,954 A | * | 6/1998 | Grabherr et al. | 74/606 R |
| 6,299,561 B1 | * | 10/2001 | Kramer et al. | 475/160 |
| 6,644,439 B2 | * | 11/2003 | Schnitzer | 184/11.1 |

* cited by examiner

Primary Examiner—Vicky A. Johnson
(74) Attorney, Agent, or Firm—Dan L. Thompson

(57) ABSTRACT

A hydraulic fluid storage apparatus for a transmission has a main sump and a secondary sump. The secondary sump is connected with the main sump through a restricted flow passage. The fluid within the main sump is subjected to centrifugal forces by rotating components within the transmission, such that at high speeds and high levels in the main sump, the restricted passage is closed by a centrifugal dam thereby resulting in fluid storage within the secondary sump. The fluid storage in the secondary sump returning to the main sump when the speed of the rotating components is reduced.

5 Claims, 1 Drawing Sheet

HYDRAULIC FLUID STORAGE APPARATUS FOR A TRANSMISSION

TECHNICAL FIELD

This invention relates to fluid storage apparatus and structure and, more particularly, to fluid storage structures for a power transmission.

BACKGROUND OF THE INVENTION

Power transmissions employ a hydraulic fluid circuit to provide lubrication and hydraulic power to various components within the transmission, such as gears, clutches, brakes, etc. These transmissions therefore need a storage area for the hydraulic fluid that is not in transit during transmission operation.

The total hydraulic fluid within the transmission is equal to the transmission that is in the transmission sump, the transmission fluid that is currently stored within a component, such a servomechanism for a clutch or brake, and the hydraulic fluid that is in transit between the transmission pump and the sump.

It is desirable to make the transmission sump volume as small as possible in order to maintain a smaller overall package for the transmission. The volume of the sump oil is required to be large enough to keep the hydraulic pump primed under all conditions and to allow for some expansion for the oil under operating conditions wherein the oil temperature is increased or under elevated speed conditions wherein the volume of fluid that is in transit is decreased. It is desirable that the sump be large enough to prevent the oil level from being operated on by the rotating parts in the transmission. These rotating parts include drums, gears, and shafts, to name a few. The continuous operation of the rotating parts beneath the level of the sump oil reduces the overall efficiency of the transmission as well as causing foaming within the transmission fluid at elevated speeds. Both of these conditions are undesirable.

Prior art transmission structures have employed external reservoirs to store excess fluid and/or thermally controlled reservoirs, which provide for fluid storage at elevated temperatures or permit the fluid to return to the basic sump when the temperature decreases, such as when the transmission sits for a long period of time without operation. Both of these additional sump or reservoir systems require valving and control mechanisms so that the main sump is always provided with a minimum amount of oil.

SUMMARY OF THE INVENTION

It is an object of the present invention to provide an improved hydraulic fluid storage system for a power transmission.

In one aspect of the present invention, an additional hydraulic storage chamber is disposed above the main transmission sump.

In another aspect of the present invention, a fluid passage is provided between the additional storage reservoir and the main storage sump.

In yet another aspect of the present invention, at least one rotating component of the power transmission imposes a centrifugal component on the hydraulic fluid in the sump to create a flow restriction between the additional sump and the main sump thereby causing the excess fluid to be stored in the additional sump.

DESCRIPTION OF AN EXEMPLARY EMBODIMENT

Figure 1:
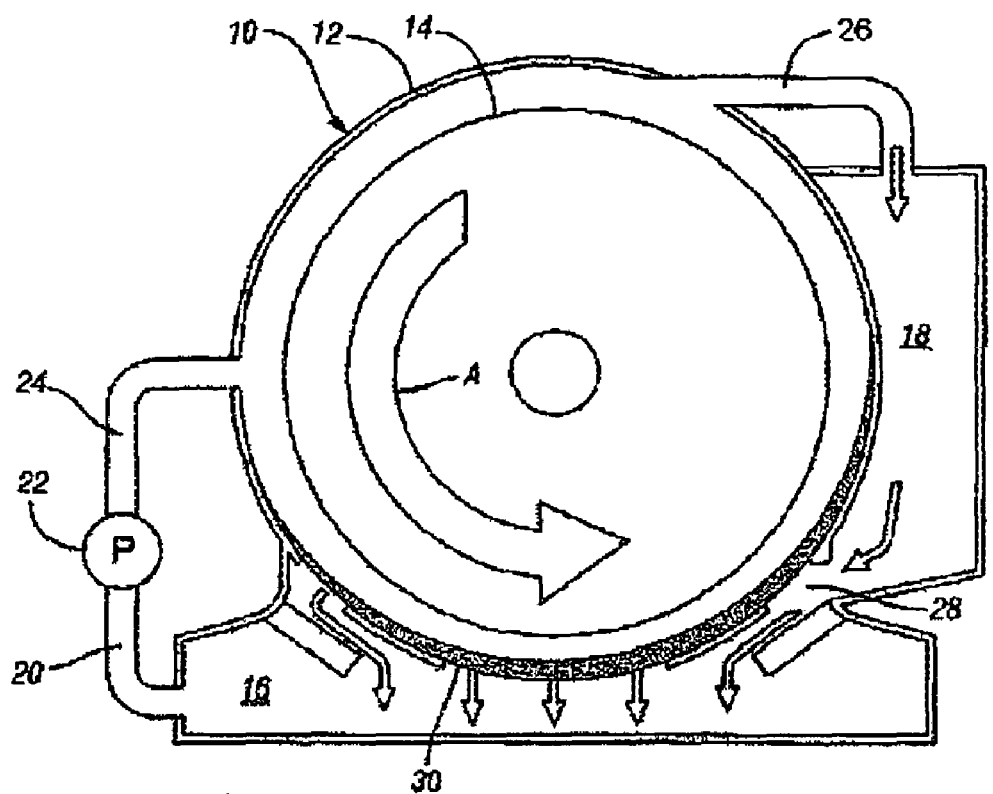
FIG. 1 is a diagrammatic representation of a portion of a transmission operating under normal fluid level and speed conditions.

Referring to the drawings, there is seen in FIG. 1 a portion of a power transmission 10 including a housing 12 and a rotating component 14. The rotating component 14 can be any of the rotating mechanisms within a power transmission, such as a clutch drum, a gear mechanism, or a shaft. It is preferable that the rotating component 14 be driven during all transmission operations, for example, an input clutch drum.

The transmission housing 12 includes a first storage chamber such as a primary or main sump or reservoir 16 and a second storage chamber such as a secondary sump or reservoir 18. The primary sump 16 is in communication with a passage 20 that in turn is connected with a conventional hydraulic pump 22. The hydraulic pump 22 delivers fluid through a passage 24 to a transmission control, not shown. The transmission control, as is well known, will distribute fluid to the operating components of the transmission as well as providing lubrication and cooling flow to the transmission.

A portion of the fluid that is expelled from operating components and returning from the cooling and lubrication operations is directed through a passage 26. The passage 26 is in fluid communication continuously with the reservoir 18. The reservoir 18 is in communication through a restricted flow passage or opening 28 with the main sump or reservoir 16.

As the component 14 rotates, hydraulic fluid 30, which is returned to the main sump 16, is acted on by centrifugal force created by the rotating component 14. The rotating component 14 rotates in the direction of Arrow A such that fluid is pumped centrifugally toward the restricted opening 28.

Figure 2:
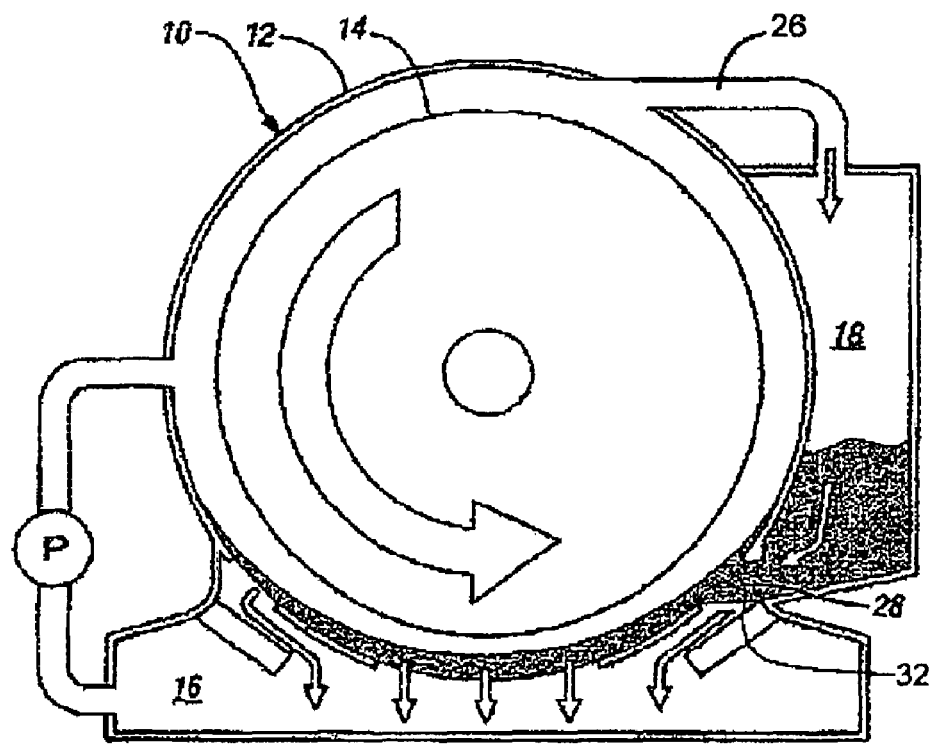
FIG. 2 is a diagrammatic representation of a portion of the transmission shown in FIG. 1 wherein the transmission is operating under increased fluid level and speed conditions.

As the speed of the component 14 increases, as seen in FIG. 2, the centrifugal force will create a hydraulic fluid dam 32, which closes the restricted passage 28 resulting in fluid being contained within the reservoir 18. As the volume in reservoir 18 increases, the volume that must be stored in the sump reservoir 16 is decreased. Thus, the fluid level in reservoir 16 is decreased, or maintained at a maximum value by this centrifugal action and reduces the amount of oil that is acted on by the centrifugal forces of the rotating component 14.

The fluid contained within the reservoir 18 might be returning lubrication fluid when the transmission is operating at high speed or it might be a sudden return of fluid from a torque-transmitting mechanism, such as a clutch or brake, when a ratio interchange occurs within the transmission. Under either situation, the fluid is returned within the reservoir 18 until it is required to maintain the level of the reservoir 16.

One such reason for returning the fluid to the reservoir 16 might be a rapid deceleration of the vehicle, where, as speed is reduced, more oil is stored in transit and higher sump levels will be required to keep the hydraulic pump primed. In this case, the centrifugal dam effect will be reduced as speed drops, releasing more of the fluid stored in the reservoir for use in the primary sump. In other conditions, a reduction in operating temperature will also reduce the fluid level within the sump 16 again reducing the centrifugal force created on the hydraulic fluid and allowing the fluid in the sump 18 to return to the sump 16.

The invention claimed is:

1. A hydraulic fluid storage apparatus for a transmission comprising:
 a transmission housing;
 a rotating transmission component supported in said housing;
 a transmission sump secured to said housing to provide a fluid storage chamber;
 a second fluid storage chamber disposed in fluid communication with said sump;
 a pump for circulating hydraulic fluid in said transmission;
 said rotating transmission component being operable to impose a centrifugal component to the fluid in an open passage between the sump and the second fluid storage chamber to create a flow restriction to interrupt fluid communication between said sump and said second fluid storage chamber to increase the fluid storage in said second fluid storage chamber and limit the fluid level in said sump to a predetermined maximum level.

2. The hydraulic fluid storage apparatus for a transmission defined in claim 1 further comprising:
 said second fluid storage chamber being disposed on said transmission housing at a level higher than said first storage chamber.

3. The hydraulic fluid storage apparatus for a transmission defined in claim 1 further comprising:
 said rotating transmission component being continuously rotated during transmission operation.

4. The hydraulic fluid storage apparatus for a transmission defined in claim 1 further comprising:
 said flow restriction including a hydraulic dam disposed between said first and second fluid storage chambers.

5. The hydraulic fluid storage apparatus for a transmission defined in claim 1 further comprising:
 said flow restriction being reduced and said fluid in said second chamber returning to said first chamber when the speed of said rotating transmission component decreases below a predetermined value.

* * * * *